(12) United States Patent
Ito

(10) Patent No.: US 7,075,873 B2
(45) Date of Patent: Jul. 11, 2006

(54) OPTICAL DISC APPARATUS WITH DISC SELECTING FUNCTION

(75) Inventor: Nobuhiko Ito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 334 days.

(21) Appl. No.: 10/370,562

(22) Filed: Feb. 24, 2003

(65) Prior Publication Data

US 2003/0179676 A1 Sep. 25, 2003

(30) Foreign Application Priority Data

Mar. 22, 2002 (JP) .................................... 2002-080086

(51) Int. Cl.
*G11B 7/00* (2006.01)

(52) U.S. Cl. ................. 369/53.2; 369/53.1; 369/53.37; 369/59.1

(58) Field of Classification Search ............... 369/47.1, 369/47.15, 47.46, 53.1, 53.2, 53.21, 53.22, 369/53.31, 53.37, 53.41, 53.45, 59.1, 59.13, 369/59.14
See application file for complete search history.

(56) References Cited

U.S. PATENT DOCUMENTS

| | | | | |
|---|---|---|---|---|
| 6,229,772 B1 | * | 5/2001 | Kumagai et al. ......... | 369/44.27 |
| 6,608,804 B1 | * | 8/2003 | Shim ....................... | 369/53.22 |
| 6,822,936 B1 | * | 11/2004 | Ono et al. ................ | 369/53.23 |
| 6,826,139 B1 | * | 11/2004 | Oh et al. .................. | 369/53.37 |

FOREIGN PATENT DOCUMENTS

| | | |
|---|---|---|
| EP | 0386913 A | 9/1990 |
| EP | 0969458 A | 1/2000 |
| JP | 2000-149392 | 5/2000 |

* cited by examiner

*Primary Examiner*—Muhammad Edun
(74) *Attorney, Agent, or Firm*—Dickstein Shapiro Morin & Oshinsky LLP

(57) ABSTRACT

A program product is used by a control computer of an optical disc apparatus. The apparatus accesses plural types of optical discs. The control computer recognizes one type of optical disc out of the plural types of optical discs based on history information including a type of optical disc used in times past according to the program. The control computer then judges whether the type of set optical disc is identified with the recognized type of optical disc.

17 Claims, 6 Drawing Sheets

| DISC TYPE | USE NUMBER |
|---|---|
| CD-ROM | 50 |
| CD-R | 36 |
| CD-RW | 12 |
| DVD-ROM | 16 |
| DVD+RW | 30 |
| DVD+R | 35 |

FIG. 2A

| DISC TYPE | USE NUMBER |
|---|---|
| CD-ROM | 50 |
| CD-R | 36 |
| CD-RW | 12 |
| DVD-ROM | 16 |
| DVD+RW | 31 |
| DVD+R | 35 |

FIG. 2B

| DATE OF USEAGE | DISC TYPE |
|---|---|
| 2002/01/12 | CD-ROM |
| 2002/01/13 | CD-R |
| 2002/01/15 | CD-RW |
| 2002/01/15 | DVD-ROM |
| 2002/01/15 | CD-R |
| 2002/01/18 | CD-R |
| 2002/01/20 | DVD+RW |
| 2002/01/20 | DVD+R |
| ⋮ | ⋮ |

FIG. 6

OPTICAL DISC APPARATUS WITH DISC SELECTING FUNCTION

BACKGROUND OF THE INVENTION

1. Field of the Invention

This invention relates to a program, a medium, a method for selecting a disc, and an optical disc apparatus. More specifically, this invention relates to a program used by an apparatus which works with plural types of optical discs, and a medium on which the program is recorded. This invention also relates to a method for selecting a type of optical disc and a preferred optical disc apparatus for carrying out the method.

2. Description of the Related Art

A personal computer, with certain upgraded functions, can be used to process audio-visual (AV) information, such as sound or video information. Because of the very large volume of such AV information, optical discs like compact disc (CD) and digital versatile disc (DVD) are being considered as information recording media. Thus, apparatuses for accessing optical discs are widely used as peripheral equipment due to low cost.

The types of optical discs available have increased as types of information brought up various topics. For example, there are CD-ROM, CD-R (CD-recordable), and CD-RW (CD-rewritable), etc., as optical discs of CD origins. There are also DVD-ROM, DVD-RAM, DVD-R (DVD-recordable), DVD-RW (DVD-rewritable), DVD+R (DVD+recordable), and DVD+RW (DVD+rewritable), etc., as optical discs of DVD origins.

Optical disc apparatuses that can access (i.e., that work with) both CD and DVD (so-called combination drive) have come onto the market for use with downsized personal computers. The combination drive sets up its operating conditions corresponding to the type of optical disc to be accessed. For example, the drive selects a light source that emits a beam of light with a wavelength of 780 nm for the optical disc of CD origin. On the other hand, the drive selects a light source that emits a beam of light with a wavelength of 650 nm for the optical disc of DVD origin. The recording surfaces of CD-R and CD-RW drives have different reflectivities. Consequently, to accommodate the different reflectivities, the optical disc apparatus sets different gains for adjusting levels regarding output signals from a photo acceptance unit in an optical pick up device.

Write at once optical discs, such as CD-R and DVD+R, which have organic dye in a recording layer, and rewritable optical discs, such as DVD+RW, CD-R and DVD+R, which have a special alloy, have different recording modes. Accordingly, the optical disc apparatus has to change the power of the laser beam emitted by the light source during the formation of marks (pits), i.e. during the controlling of write power, corresponding to the type of optical disc. It is necessary for optical disc drives to determine the type of optical disc to be accessed for accessing precisely.

There is a method for detecting a focus position as a method for judging whether an inserted disc is CD or DVD. An optical disc apparatus assumes an optical disc to be DVD and sets various conditions for DVD. The optical disc apparatus then drives a focus servo for an inserted optical disc and, as an example, compares a level of a focus error signal with a predetermined threshold level. The optical disc apparatus checks whether the focus position can be detected normally or not based on a result of the comparison. If the focus position can be detected normally, the optical disc apparatus judges that the inserted optical disc is a DVD.

If the focus position cannot be detected normally, the optical disc apparatus judges that the inserted optical disc is not a DVD and assumes the disc to be a CD and sets various conditions for CD. If the focus position can be detected normally, the optical disc apparatus judges that the inserted optical disc is a CD. If the focus position cannot be detected normally, the optical disc apparatus executes predetermined error processes. Since the optical disc apparatus has to select a type of optical disc after assuming a type of optical disc in order of preset and setting various conditions for the assumed optical disc in the above-mentioned disc selecting method, it may take a long time to make a selection if there are many types of optical discs that can be selected.

Japanese Laid-open patent application 2000-149,392 discloses a disc reproducing apparatus which pumps and dumps an objective lens in a vertical direction relative to a signal recording surface on a disc when the disc is mounted. The disc reproducing apparatus selects a type of optical disc (DVD with monolayer, DVD with double layer, CD-ROM and CD-RW) based on the number of S curves and amplitude value included in detected focus error signals. This disc reproducing apparatus, however, has to limit the types of discs that can be selected because of selecting based on the S curve included in the focus error signal.

An object of the present invention is to provide a program product and a medium on which the program is recorded. The program is executed by a control computer in an optical disc apparatus. The apparatus can access plural types of optical discs. The control computer is able to select a type of set optical disc. Another object of the present invention is to provide a method for selecting a type of disc. It can take a short time to select a type of optical disc by this method. Another object of the present invention is to provide an optical disc apparatus which can handle plural types of optical discs, and which determines the type of the set optical disc in a short period of time.

SUMMARY OF THE INVENTION

The present invention is directed to a program product used by a control computer included in an optical disc apparatus which works with (i.e., which receives) plural types of optical discs. In operation, the control computer first recognizes one type of optical disc out of the plural types of optical discs based on history information. The history information may include a type of optical disc used in times past according to the program. The control computer then judges whether the set optical disc is the recognized type of optical disc.

The present invention is also directed to a method for determining the type of an optical disc set to (or located in) an optical disc apparatus. The method includes the step of recognizing one type of optical disc used the last time based on history information including a type of optical disc used in times past. The method also includes the step of judging whether the set optical disc is the recognized type of optical disc.

The present invention is further directed to an optical disc apparatus which can access plural types of optical discs. The optical disc apparatus memorizes history information including a type of optical disc used in times past and selects a type of optical disc set to the optical disc apparatus based on the history information.

BRIEF DESCRIPTION OF THE DRAWINGS

FIG. 2A is a table for selecting a disc included in the optical disc apparatus shown in FIG. 1.

FIG. 2B is another table for selecting a disc included in the optical disc apparatus shown in FIG. 1.

FIG. 6 shows another example of history (record) information.

DETAILED DESCRIPTION OF PREFERRED EMBODIMENTS

Figure 1:
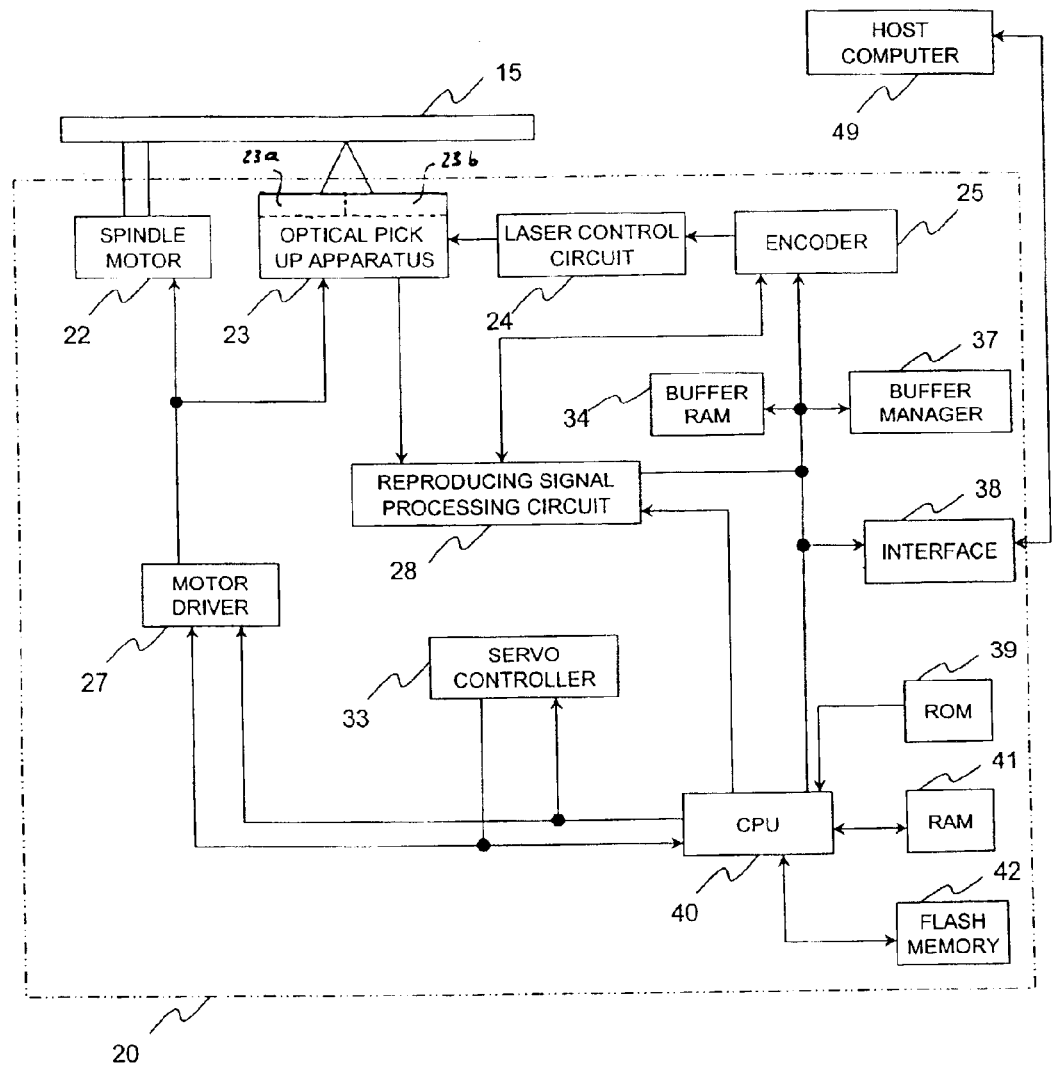
FIG. 1 is a schematic block diagram of an optical disc apparatus constructed in accordance with a preferred embodiment of the present invention.

A schematic drawing of an optical disc apparatus 20 is shown in FIG. 1. The optical disc apparatus 20 includes a spindle motor 22 for rotating an optical disc 15, an optical pick up device 23, a laser control circuit 24, an encoder 25, a motor driver 27, a reproducing signal processing circuit 28, a servo controller 33, a buffer RAM 34, a buffer manager 37, an interface 38, a ROM 39, a flash memory (chip) 42 as memory means, a CPU 40, a RAM 41 and so forth. Arrows in FIG. 1 represent flows of typical signals or information and do not represent all of the connections between each block.

The optical pick up device 23 includes a first laser diode (semiconductor laser) 23a, a second laser diode (semiconductor laser) 23b, an optical system, a photo acceptance unit, a drive system and so forth. The first laser diode 23a emits a laser beam with a wavelength of 650 nm. The second laser diode 23b emits a laser beam with a wavelength of 780 nm. (The first and second laser diodes 23a, 23b may be separate devices or they may be integrally formed and/or have parts in common.) The optical system transmits a beam of light emitted by the selected laser diode into a recording surface on the optical disc 15, and also transmits a return beam of light reflected by the recording surface into a predetermined photo acceptance position. The photo acceptance unit is arranged at the photo acceptance position and accepts the return beam of light. The photo acceptance unit outputs electric current (current signal) corresponding to the amount of accepted light to the reproducing signal processing circuit 28. The drive system includes a focusing actuator, a tracking actuator, and a seek motor.

The reproducing signal processing circuit 28 converts current signals output from the optical pick up device 23 into voltage signals corresponding to a type of the optical disc 15. The reproducing signal processing circuit 28, then, detects wobble signals, reproducing signals, servo signals (focus error signal, track error signal etc.) and so forth based on the voltage signals. The reproducing signal processing circuit 28, further, obtains address information, synchronization signals and so forth, from the wobble signals. The address information is output to the CPU 40. The synchronization signals are output to the encoder 25. The reproducing signal processing circuit 28 also executes error-correction processes, etc., for the reproducing signals and then stores the reproducing signals in the buffer RAM 34 by the buffer manager 37. The servo signals are output to the servo controller 33 from the reproducing signal processing circuit 28. Additionally, the reproducing signal processing circuit 28 sets servo parameters such as gains for adjusting a signal level corresponding to a type of the optical disc 15 based on a command from the CPU 40.

The servo controller 33 generates control signals for controlling the optical pick up device 23 based on the servo signals and outputs the control signals to the motor driver 27. The buffer manager 37 manages input/output of data to the buffer RAM 34 and informs the CPU 40 if data are stored to a predetermined value. The motor driver 27 controls the optical pick up device 23 and the spindle motor 22 based on the control signals from the servo controller 33 and commands from the CPU 40. The encoder 25 pulls data stored in the buffer RAM 34 out through the buffer manager 37 based on a command from the CPU 40. The encoder 25 also adds error-correction code to the data pulled out and transmits write data for the optical disc 15. The encoder 25, based on commands from the CPU 40, outputs the write data to the laser control circuit 24 in synchronization with synchronization signals from the reproducing signal processing circuit 28.

The laser control circuit 24 controls the output of the laser beam generated by the optical pick up device 23 based on the write data from the encoder 25. The laser control circuit 24 makes either the first laser diode or the second laser diode a controlled object. The interface 38 is a two-way communication interface with a host computer (personal computer, etc.) 49. The interface 38 may be compliant with a standard interface such as ATAPI (AT Attachment Packet Interface) and SCSI (Small Computer System Interface). The ROM 39 stores programs including a program for selecting a type of optical disc (hereinafter referred to as a disc distinguishing program). The programs are described as readable codes by the CPU 40.

The flash memory 42 is a nonvolatile memory. The flash memory keeps stored data even if the power is turned off. The CPU 40 writes and reads data in the flash memory 42. The CPU 40 controls the operation of each of the above-mentioned parts of the optical disc apparatus 20 according to the programs stored in the ROM 39. The CPU 40 saves such data as necessary for controlling the parts in the RAM 42 temporarily. In case the circuit system in the optical disc apparatus 20 separates into a circuit system for CD and a circuit system for DVD in the above-mentioned each part, the CPU 40 outputs a signal for choosing either. When the optical disc apparatus 20 is turned on, the programs stored in the ROM 39 are loaded to a main memory in the CPU 40.

In the illustrated embodiment, the optical disc apparatus 20 is accessible to CD-ROM, CD-R, CD-RW, DVD-ROM, DVD+RW and DVD+R. A disc selecting table and last disc information are used as history (record) information in the optical disc apparatus 20. Results of counting by types of optical discs used in the past are recorded in the disc selecting table. FIG. 2A shows, as an example, a disc selecting table for use in the illustrated embodiment of the invention. The results of counting (in the illustrated example, 50 times for CD-ROM, 36 times for CD-R, 12 times for CD-RW, 16 times for DVD-ROM, 30 times for DVD+RW, and 35 times for DVD+R) are recorded as shown in FIG. 2A. The disc selecting table is stored in the flash memory 42. The type of optical disc used the last time is recorded in the last disc information. The last disc information is stored in the flash memory 42. In the illustrated example, the optical disc that was used the last time is a CD-ROM. An ejecting flag HF that judges whether the optical disc used the last time is ejected is also stored in the flash memory 42. This ejecting flag HF is reset to 0 when the disc is ejected.

When the optical disc 15 is set at a predetermined position in the optical disc apparatus 20, the optical disc apparatus 20 executes a process for selecting a type of optical disc (hereinafter referred to as disc selecting process). The disc selecting process is illustrated in FIGS. 3 through 5, corresponding to a series of processing algorithms executed by the CPU 40.

Figure 3:
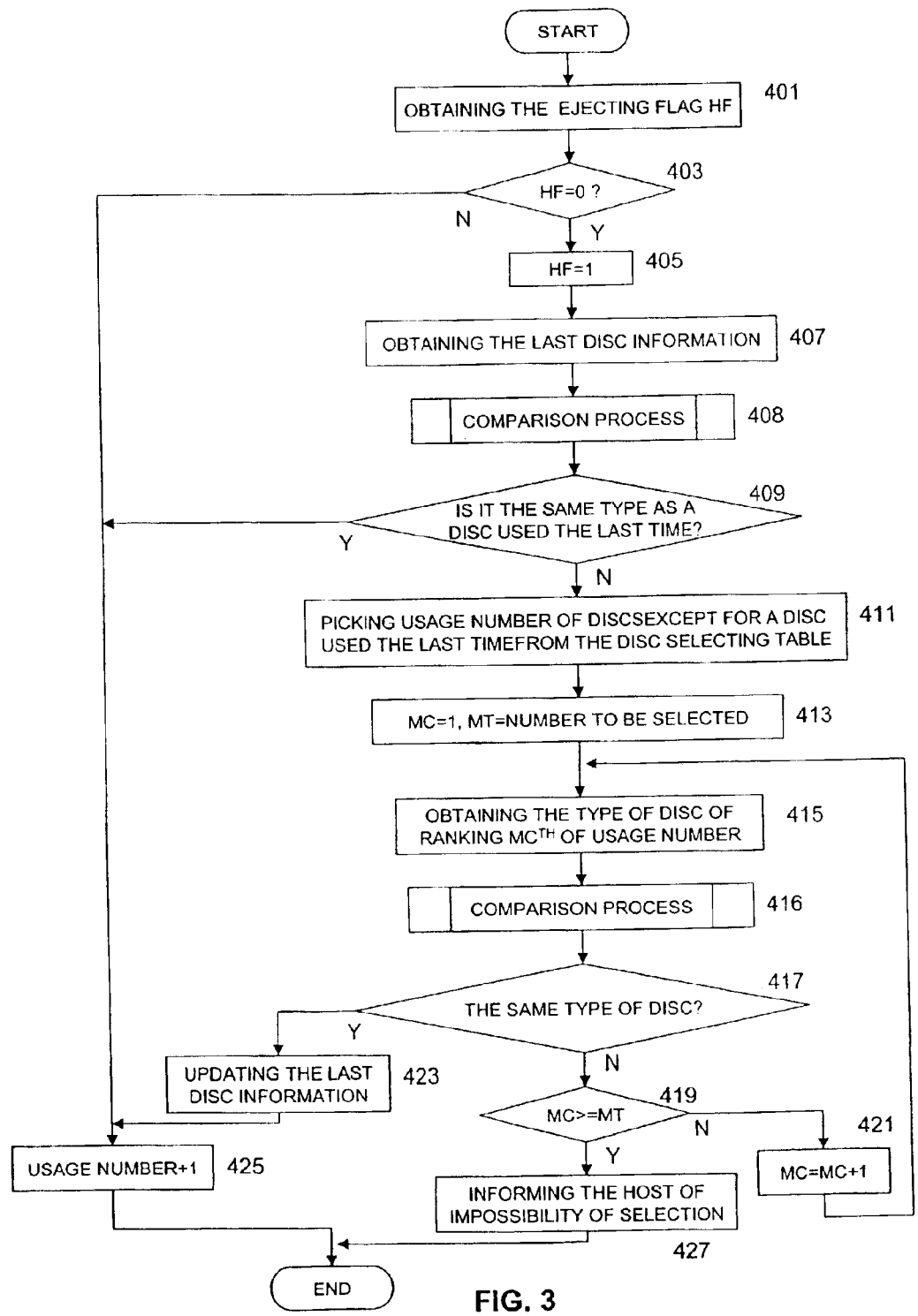
FIG. 3 is a flowchart of processes for selecting a disc in accordance with a preferred embodiment of the present invention.

When the optical disc 15 is set at a predetermined position in the optical disc apparatus 20, a leading address of the disc selecting program is set in a program counter in the CPU 40 and the algorithm corresponding to the flowchart of FIG. 3 is started. DVD+R is the set optical disc 15 here as an example (the "set" optical disc is the one that is located in the apparatus, in this example). The CPU obtains the ejecting flag HF stored in the flash memory 42 in step 401. The CPU 40 judges whether the ejecting flag is '0.' In this case, an optical disc used the last time has already been ejected and the CPU 40 has reset to '0.' The CPU 40, then, affirms the judgment in step 401 and moves to step 405. The CPU 40 sets the ejecting flag HF to 1. The CPU 40 reads out the last disc information stored in the flash memory 42 and recognizes a type of optical disc used the last time (here as CD-ROM) in step 407. The CPU 40 moves to a subroutine for comparative processes of step 408 to judge whether the type of the set optical disc 15 is identified with the type of optical disc recognized in step 407.

Figure 4:
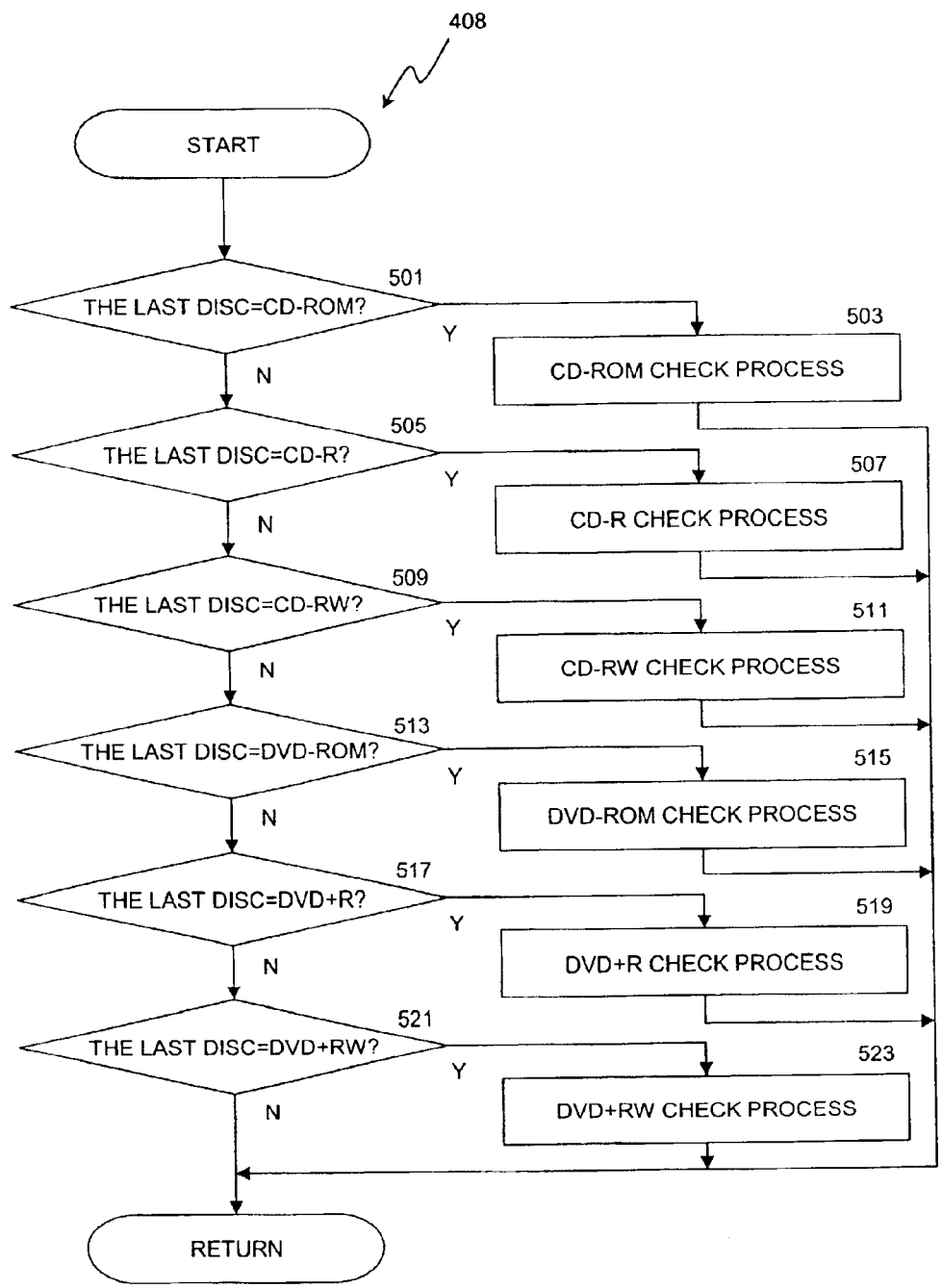
FIG. 4 is a flowchart for describing step 408 in FIG. 3 in detail.
Figure 5:
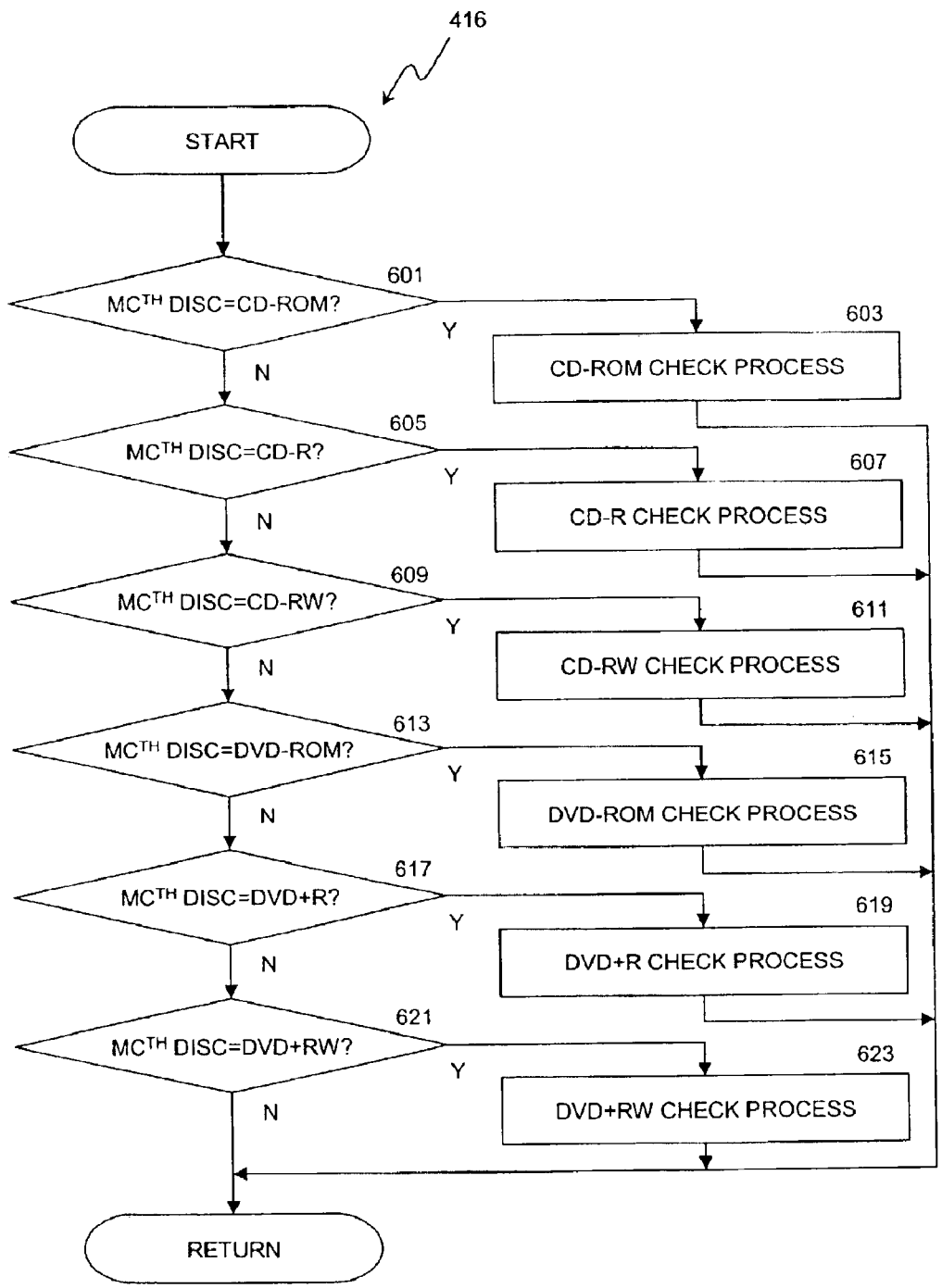
FIG. 5 is a flowchart for describing step 416 in FIG. 3 in detail.

In the subroutine of step 408, first, the CPU 40 judges whether the optical disc used the last time is CD-ROM (FIG. 4; step 501). In this case, since the optical disc used the last time is CD-ROM, the CPU 40 affirms the judgment in step 501 and moves to a process for checking CD-ROM in step 503. In step 503, the CPU 40 sets various conditions for CD-ROM, such as choice of the second laser diode and the circuit system for CD, and installation of servo parameters for CD-ROM. The CPU 40 then rotates the optical disc 15 at a predetermined linear velocity (e.g., 1 time speed) and takes tracking and focusing controls. In this case, the CPU 40 cannot take normal tracking and focusing controls. Accordingly, the CPU 40 judges that the optical disc 15 is not CD-ROM and sets '0' (meaning the type of the set optical disc 15 is not identified with the recognized type of optical disc) to a selecting flag SF representing whether the type of the optical disc 15 is identified. Accordingly, the CPU 40 finishes the comparative processes in step 408 and returns from the subroutine.

Next, the CPU 40 moves to step 409 (FIG. 3). The CPU 40 judges whether the optical disc 15 is the same type as the optical disc used the last time in reference to the selecting flag SF in step 409. In this case, since the selecting flag SF is set to '0,' the CPU 40 denies the judgment in step 409 and moves to step 411. In step 411, the CPU 40 reads out the disc selecting table stored in the flash memory 42. The CPU 40 then picks out the number of usage of each type of optical disc, except for the type disc used in the past, and sorts types of optical discs in descending order of the number of usage. The CPU 40 sets '1' to counter MC representing rank order (in descending order) of the number of usage and also sets a value that is taken 1 from the number of accessible types of optical discs to MT. Accordingly, in this case, MT=6 (i.e., CD-ROM, CD-R, CD-RW, DVD-ROM, DVD+RW, DVD+R)-1=5. The CPU 40 recognizes a type of optical disc of ranking 'MC'th of the number of usage in step 415 (in this case, MC=1 and a type of optical disc of ranking 1st is CD-R). The CPU 40 moves to a subroutine for comparative processes (step 416) to judge whether the type of the optical disc 15 is identified with the recognized type of optical disc in step 415.

The subroutine of step 416 is shown in FIG. 5 in detail. In step 601, the CPU 40 judges whether the type of optical disc of ranking 'MC'th is CD-ROM. In this case, since the type of optical disc of ranking 'MC'th is CD-R, the CPU 40 denies the judgment in step 601 and moves to step 605. In step 605, the CPU 40 judges whether the type of optical disc of ranking 'MC'th is CD-R. In this case, since the type of optical disc of ranking 'MC'th is CD-R, the CPU 40 affirms the judgment in step 605 and moves to a process for checking CD-R in step 607. In step 607, the CPU 40 sets various conditions for CD-R, such as choice of the second laser diode and the circuit system for CD, and installation of servo parameters for CD-R. The CPU 40 then rotates the optical disc 15 in a predetermined linear velocity (e.g., 1 time speed) and takes tracking and focusing controls. In this case, the CPU 40 cannot take normal tracking and focusing controls. The CPU 40 judges that the optical disc 15 is not CD-R and sets '0' to a selecting flag SF. Accordingly, the CPU 40 finishes the comparative processes in step 416 and returns from the subroutine.

Next, the CPU 40 moves to a process of step 417. The CPU 40 judges whether the optical disc 15 is the same type as the optical disc of ranking 'MC'th in reference to the selecting flag SF in step 417. In this case, since the selecting flag SF is set to '0,' the CPU 40 denies the judgment in step 417 and moves to step 419. The CPU 40 judges whether MC is not less than MT in step 419. In this case, since MC=1 and MT=5, the CPU 40 denies the judgment in step 419 and moves to step 421. In step 421, the CPU 40 increases MC value by 1 (MC=MC+1) and returns to step 415.

The CPU 40 recognizes a type of optical disc of ranking 'MC'th of the number of usage in step 415 (in this case, MC=2 and a type of optical disc of ranking 2nd is DVD+R). The CPU 40 moves to a subroutine for comparative processes (step 416) to judge whether the type of the optical disc 15 is identified with the recognized type of optical disc in step 415.

The CPU 40 judges whether the type of optical disc of ranking 'MC'th is CD-ROM in step 601 (FIG. 5). In this case, since the type of optical disc of ranking 'MC'th is DVD+R, the CPU 40 denies the judgment in step 601 and moves to step 605. In step 605, the CPU 40 judges whether the type of optical disc of ranking 'MC'th is CD-R. In this case, since the type of optical disc of ranking 'MC'th is DVD+R, the CPU 40 denies the judgment in step 605 and moves to step 609.

In step 609, the CPU 40 judges whether the type of optical disc of ranking 'MC'th is CD-R. In this case, since the type of optical disc of ranking 'MC'th is DVD+R, the CPU 40 denies the judgment in step 609 and moves to step 613. In step 613, the CPU 40 judges whether the type of optical disc of ranking 'MC'th is DVD-ROM. In this case, since the type of optical disc of ranking 'MC'th is DVD+R, the CPU 40 denies the judgment in step 613 and moves to step 617.

In step 617, the CPU 40 judges whether the type of optical disc of ranking 'MC'th is DVD+R. In this case, since the type of optical disc of ranking 'MC'th is DVD+R, the CPU 40 affirms the judgment in step 617 and moves to a process for checking DVD+R in step 619. In step 619, the CPU 40 sets various conditions for DVD+R such as choice of the first laser diode and the circuit system for DVD, and installation of servo parameters for DVD+R. The CPU 40 then rotates the optical disc 15 at a predetermined linear velocity (e.g., 1 time speed) and takes tracking and focusing controls. In this case, since the CPU 40 obtains the reflection coefficient between 45% and 85%, the CPU 40 recognizes the optical disc 15 as either DVD+R or DVD-ROM with monolayer. The CPU 40 checks whether the optical disc 15 has ADIP (ADdress In Pregroove) information. In this case, since the optical disc apparatus 20 can obtain the ADIP information, the CPU 40 affirms the optical disc 15 is DVD+R and sets '1' to the selecting flag SF. Accordingly, the CPU 40 finishes the comparative processes in step 416 and returns from the subroutine.

Next, in step 417 (FIG. 3), the CPU 40 judges whether the optical disc 15 is the same type as the optical disc of ranking 'MC'th in reference to the selecting flag SF. In this case, since the selecting flag SF is set to '1,' the CPU 40 affirms the judgment in step 417 and moves to step 423.

In step 423, the CPU 40 updates the last disc information to DVD+R and stores it in the flash memory 42. The CPU 40 increases the number of usage of DVD+R by 1 and stores the increased number in the flash memory 42 as shown in FIG. 2B. Alternatively, at this juncture, the CPU 40 may sort the disc selecting table in descending order of the number of usage. Then, the CPU 40 finishes the disc selecting process.

On the other hand, in step 403, since the disc selecting process is already done in case the ejecting flag HF is not '0,' the CPU 40 denies the judgment in step 403 and moves to step 425. In step 409, in case the optical disc 15 is the same type as the optical disc used the last time, the selecting flag is '1.' The CPU 40 then affirms the judgment in step 409 and moves to step 425. In step 419, in case MC is not less than MT, the CPU 40 affirms the judgment in step 419 and moves to step 427. The CPU 40, in step 427, informs the host computer 49 that the type of the optical disc 15 cannot be selected and finishes the disc selecting process. In the subroutine shown in FIG. 4, the CPU 40 sets '1' to the selecting flag SF in case the types of the optical discs are judged to be identified with in step 503.

In case the CPU 40 denies the judgment in step 501, the CPU 40 moves to step 505 and judges whether the optical disc used the last time is CD-R. If the CPU 40 affirms the judgment in step 505, then the CPU 40 moves to a process for checking CD-R (step 507). In step 507, the CPU 40 sets various conditions for CD-R, such as choice of the second laser diode and the circuit system for CD, and installation of servo parameters for CD-R. The CPU 40 judges whether the types of the optical discs are identified with based on servo controllability, reflection coefficient, amplitude of track error signal, ATIP (Absolute Time In Pregroove) information, and so forth. If the CPU 40 judges that the types of the optical discs are identified with, the CPU 40 sets '1' to the selecting flag SF. If the CPU 40 judges that the types of the optical discs are not identified with, the CPU 40 sets '0' to the selecting flag SF. Then, the CPU 40 finishes the comparative processes in step 408 and returns from the subroutine.

In case the CPU 40 denies the judgment in step 505, the CPU 40 moves to step 509 and judges whether the optical disc used the last time is CD-RW. If the CPU 40 affirms the judgment in step 509, then the CPU 40 moves to a process for checking CD-RW (step 511). In step 511, the CPU 40 sets various conditions for CD-RW, such as choice of the second laser diode and the circuit system for CD, and installation of servo parameters for CD-RW. The CPU 40 judges whether the types of the optical discs are identified with based on servo controllability, reflection coefficient, amplitude of track error signal, ATIP information and so forth. If the CPU 40 judges that the types of the optical discs are identified with, the CPU 40 sets '1' to the selecting flag SF. If the CPU 40 judges that the types of the optical discs are not identified with, the CPU 40 sets '0' to the selecting flag SF. Then, the CPU 40 finishes the comparative processes in step 408 and returns from the subroutine.

In case the CPU 40 denies the judgment in step 509, CPU 40 moves to step 513 and judges whether the optical disc used the last time is DVD-ROM. If the CPU 40 affirms the judgment in step 513, then the CPU 40 moves to a process for checking DVD-ROM in step 515. In step 515, the CPU 40 sets various conditions for DVD-ROM such as choice of the first laser diode and the circuit system for DVD, and installation of servo parameters for DVD-ROM. The CPU 40 judges whether the types of the optical discs are identified with based on servo controllability, reflection coefficient, control data and so forth. If the CPU 40 judges that the types of the optical discs are identified with, the CPU 40 sets '1' to the selecting flag SF. If the CPU 40 judges that the types of the optical discs are not identified with, the CPU 40 sets '0' to the selecting flag SF. Then, the CPU 40 finishes the comparative processes in step 408 and returns from the subroutine.

In case the CPU 40 denies the judgment in step 513, the CPU 40 moves to step 517 and judges whether the optical disc used the last time is DVD+R. If the CPU 40 affirms the judgment in step 517, then the CPU 40 moves to a process for checking DVD+R in step 519. In step 519, the CPU 40 sets various conditions for DVD+R such as choice of the first laser diode and the circuit system for DVD, and installation of servo parameters for DVD+R. The CPU 40 judges whether the types of the optical discs are identified with based on servo controllability, reflection coefficient, amplitude of track error signal, ADIP information and so forth. If the CPU 40 judges that the types of the optical discs are identified with, the CPU 40 sets '1' to the selecting flag SF. If the CPU 40 judges that the types of the optical discs are not identified with, the CPU 40 sets '0' to the selecting flag SF. Then, the CPU 40 finishes the comparative processes in step 408 and returns from the subroutine.

In case the CPU 40 denies the judgment in step 517, the CPU 40 moves to step 521 and judges whether the optical disc used the last time is DVD+RW. If the CPU 40 affirms the judgment in step 521, then the CPU 40 moves to a process for checking DVD+RW in step 523. In step 523, the CPU 40 sets various conditions for DVD+RW, such as choice of the first laser diode and the circuit system for DVD, and installation of servo parameters for DVD+RW. The CPU 40 judges whether the types of the optical discs are identified with based on servo controllability, reflection coefficient, amplitude of track error signal, ADIP information and so forth. If the CPU 40 judges that the types of the optical discs are identified with, the CPU 40 sets '1' to the selecting flag SF. If the CPU 40 judges that the types of the optical discs are not identified with, the CPU 40 sets '0' to the selecting flag SF. Then, the CPU 40 finishes the comparative processes in step 408 and returns from the subroutine.

In case the CPU 40 denies the judgment in step 521, the CPU 40 sets '0' to the selecting flag SF. Then, the CPU 40 finishes the comparative processes in step 408 and returns from the subroutine. In the subroutine shown in FIG. 5, the CPU 40 sets '1' to the selecting flag SF in case the types of the optical discs are judged to be identified with in step 607.

In case the CPU 40 affirms the judgment in step 601, the CPU 40 moves to step 603. The CPU 40 executes the same process for checking CD-ROM as step 503 in step 603. Then, the CPU 40 finishes the comparative processes in step 416 and returns from the subroutine.

In case the CPU 40 denies the judgment in step 605, the CPU 40 moves to step 609. The CPU 40 judges whether the type of optical disc of ranking 'MC'th is CD-RW in step 609. In case the CPU 40 affirms the judgment in step 609, the CPU 40 moves to step 613. The CPU 40 executes the same process for checking CD-RW as step 511 in step 611. Then, the CPU 40 finishes the comparative processes in step 416 and returns from the subroutine.

In case the CPU 40 denies the judgment in step 609, the CPU 40 moves to step 613. The CPU 40 judges whether the type of optical disc of ranking 'MC'th is DVD-ROM in step 613. In case the CPU 40 affirms the judgment in step 613, the CPU 40 moves to step 615. The CPU 40 executes the same process for checking DVD-ROM as step 515 in step 615. Then, the CPU 40 finishes the comparative processes in step 416 and returns from the subroutine.

In case the CPU 40 denies the judgment in step 613, the CPU 40 moves to step 617. The CPU 40 judges whether the type of optical disc of ranking 'MC'th is DVD+R in step 617. In case the CPU 40 denies the judgment in step 617, the CPU 40 moves to step 621. The CPU 40 judges whether the type of optical disc of ranking 'MC'th is DVD+RW in step 621. In case the CPU 40 affirms the judgment in step 621, the CPU 40 moves to step 623. The CPU 40 executes the same process for checking DVD+RW as step 523 in step 623. Then, the CPU 40 finishes the comparative processes in step 416 and returns from the subroutine. In case the CPU 40 denies the judgment in step 621, the CPU 40 sets '0' to the selecting flag SF. The CPU 40 then finishes the comparative processes in step 416 and returns from the subroutine.

The optical disc apparatus 20 records data on the optical disc 15 as described below. In this case, various conditions for the optical disc 15 have been set in the above-described disc selecting process. The CPU 40 outputs control signals, for controlling the rotation of the spindle motor 22, to the motor driver 27. The control signals may be based on recording speed assigned by the host computer 49. The CPU 40 informs the reproducing signal processing circuit 28 that the CPU 40 receives a write command from the host computer 49. When the rotation of the optical disc 15 reaches a predetermined linear velocity, the reproducing signal processing circuit 28 detects address information, focus error signals and track error signals based on output signals from the optical pick up device 23. The address information is output from the reproducing signal processing circuit 28 to the CPU 40. The focus error signals and track error signals are output to the servo controller 33. The servo controller 33 drives the focusing actuator in the optical pick up device 23 through the motor driver 27 based on the focus error signals and compensates for deviation from appropriate focusing. In other words, the servo controller 33 executes a focusing control. The servo controller 33 also drives the tracking actuator in the optical pick up device 23 through the motor driver 27 based on the track error signals and compensates for deviation from appropriate tracking. In other words, the servo controller 33 executes a tracking control.

The CPU 40 stores write data from the host computer 49 in the buffer RAM 34 through the buffer manager 37. When the CPU 40 receives information that the amount of data stored in the buffer RAM 34 is more than a predetermined value, the CPU 40 commands the encoder 25 to make recording data. The CPU 40 then outputs signals directing a seek operation of the optical pick up device 23 for locating the optical pick up device 23 in a designated writing start position to the motor driver 27 based on the address information. When the CPU 40 judges that a position of the optical pick up device 23 is the writing start position based on the address information, the CPU 40 informs the encoder 25. The encoder 25 records recording data on the optical disc 15 through the laser control circuit 24 and the optical pick up device 23.

The optical disc apparatus 20 reproduces data on the optical disc 15 as described below. In this case, various conditions for the optical disc 15 have been set in the above-described disc selecting process. When the CPU 40 receives a read command from the host computer 49, the CPU 40 outputs a control signal, for controlling the rotation of the spindle motor 22, to the motor driver 27 based on reproducing speed. The CPU 40 informs the reproducing signal processing circuit 28 that the CPU 40 receives a read command from the host computer 49. When the rotation of the optical disc 15 reaches a predetermined linear velocity, the reproducing signal processing circuit 28 detects address information, focus error signals and track error signals based on output signals from the optical pick up device 23. The address information is output from the reproducing signal processing circuit 28 to the CPU 40. The focus error signals and track error signals are output to the servo controller 33. The servo controller 33 executes focusing control and tracking control as described above. The CPU 40 then outputs signals directing seek operation of the optical pick up device 23 for locating the optical pick up device 23 in a designated reading start position to the motor driver 27 based on the address information.

When the CPU 40 judges that a position of the optical pick up device 23 is the reading start position based on the address information, the CPU 40 informs the reproducing signal processing circuit 28. The reproducing signal processing circuit 28 detects RF signals based on the output signals from the optical pick up 23 and executes an error correction process, etc. The reproducing signal processing circuit 28 then stores the reproducing data in the buffer RAM 34. When the reproducing data stored in the RAM 34 make a sector data, the buffer manager 37 transmits the sector data to the host computer 49 through the interface 38. The reproducing signal processing circuit 28 continues to detect the focus error signals and the track error signals based on the output signals from the optical pick up device 23 and to compensate for deviation from appropriate focusing or tracking, until the recording process or the reproducing process is finished.

In the illustrated embodiment, the CPU 40 constitutes a selecting means for selecting (or determining) the type of the set optical disc and a registering means for registering the result of selecting by the selecting means in the history (record) information. The processes executed by the CPU 40 shown in FIG. 3 to FIG. 5 are stored in the ROM 39 as a disc selecting program. At least one part of each component affected by the processes of the CPU 40 according to the program as described above may be made of hardware. Alternatively, all components affected by the processes of the CPU 40 according to the program as described above may be made of hardware.

The optical disc apparatus 20 compares the set optical disc with the optical disc used the last time in the beginning period of the disc selecting process. Since the frequency that the same types of optical discs are used one after another is very high generally, the probability that the type of optical disc used is the same type as the one used the last time is also very high. In other words, the type of the set optical disc is identified with the type of the optical disc used the last time in many cases. Accordingly, it is possible to select the type of the set optical disc in a short period. The optical disc apparatus 20 gives priority to the comparison with the type of optical disc with high frequency usage. Types of optical discs a user uses are limited to few types in many cases and a specific type of optical disc tends to be used frequently. In other words, since the number of usage of the specific type of optical disc is large, the type of the set optical disc is identified with the type of the optical disc with high frequency usage. Accordingly, it is possible to select the type of the set optical disc in a short period.

Further, the optical disc apparatus 20 judges whether the optical disc used the last time was ejected before the disc selecting process. For example, in case the optical disc apparatus 20 is turned off without ejecting the optical disc and is turned on again, it is useless to execute the disc selecting process. The optical disc apparatus 20 judges whether the optical disc used the last time was ejected before the disc selecting process and uses the previous result of the disc selecting process in case the disc was not ejected. Accordingly, it is possible to select the type of the set optical disc in a short period. The history (record) information is stored in the flash memory 42. If the optical disc apparatus 20 is turned off, the history information is not vanished. Consequently, it is possible to use the history of past usage effectively.

The optical disc apparatus 20 may execute the disc selecting process corresponding to a command from the host computer 49. For example, when the optical disc apparatus 20 records data on a recordable optical disc, an application software for recording (so-called writer software) of the host computer 49 side may need the type of the optical disc. The optical disc apparatus 20 may skip step 403 in FIG. 3 in case the optical disc used the last time has been ejected without fault. The optical disc apparatus 20 may judge whether the type of the set optical disc is identified with the type of optical disc of ranking 'MC'th in the preset order instead in descending order. In this case, the host computer 49 may be able to set or change the preset order. The optical disc apparatus 20 may judge whether the type of the set optical disc is identified with only the type of optical disc of ranking 1st instead of in descending order. If the optical disc apparatus 20 judges the type of the set optical disc is not identified with only the type of optical disc of ranking 1st, the optical disc apparatus 20 may judge other types in the preset order.

The disc selecting program may be recorded in other information recording media such as a CD-ROM, a magnetic optical disc, a flash memory, a flexible disc, etc. The disc selecting program is not necessarily stored in the ROM 39. In this case, a drive apparatus corresponding to each information recording medium is added, and the selecting program is installed from the drive apparatus. After all, the disc selecting program may be loaded to main memory in the CPU 40. The optical disc apparatus may be arranged in the body of the host computer 49 (i.e., built-in type). Alternatively, the optical disc apparatus may be arranged in another body of the host computer 49 (i.e., external type).

The optical disc apparatus 20 may be an information reproducing apparatus only or it may an information recording apparatus only. The optical disc apparatus 20 may be an apparatus accessible to only DVD origins or only CD origins. The wavelengths of the beam of light emitted from the optical pick up device are not limited to two types.

The optical disc apparatus 20 may recognize the type of the optical disc by statistical technique instead of by the number of usage. In case the optical disc apparatus 20 does not have the disc selecting table, the optical disc apparatus 20 may use a preset default data. If the optical disc apparatus 20 does not have the last disc information, the optical disc apparatus 20 may use a preset default data.

The disc selecting table may be based on the date (and hour) of use and a type of optical disc, as shown in FIG. 6, instead of a type of optical disc and the number of usage. The optical disc apparatus 20 may be an apparatus accessible to at least two types of optical discs instead of the 6 types (CD-ROM, CD-R, CD-RW, DVD-ROM, DVD+RW, DVD+R) discussed above. The optical disc apparatus 20 may be an apparatus accessible to DVD-R, DVD-RW, DVD-RAM and so forth. The optical disc apparatus 20 may be an apparatus that is necessary to change various conditions corresponding to the type of optical disc. In step 408, since the optical disc apparatus 20 (the CPU 40) already has recognized the type of the optical disc used the last time, the CPU 40 may proceed directly to the process for checking the type of the optical disc used the last time. In step 416, since the optical disc apparatus 20 (the CPU 40) already has recognized the type of optical disc of ranking 'MC'th, the CPU 40 may proceed directly to the process for checking the type of optical disc of ranking 'MC'th.

In each process for checking in step 408 and 416, the CPU 40 rotates the optical disc 15 in a predetermined linear manner and checks whether the optical disc apparatus 20 can reproduce predetermined information, such as taking tracking and focusing controls. This invention, however, is not limited to this process. For example, the optical disc apparatus 20 (mainly the CPU 40) may judge the difference between CD-ROM or CD-R and CD-RW by measuring reflection coefficients from recording layers. The reflection coefficient for CD-ROM or CD-R is not less than 65% and that for CD-RW is around 20%. Since the optical disc apparatus 20 (mainly the CPU 40) can not obtain signals including ATIP information from CD-ROM, the optical disc apparatus 20 may distinguish CD-ROM from other CD origins. The optical disc apparatus 20 (mainly the CPU 40) may judge the difference between DVD-ROM with monolayer or DVD+R and DVD-ROM with double layer or DVD+RW by measuring reflection coefficients from recording layers. The reflection coefficient for DVD-ROM with monolayer or DVD+R is from 45% to 85% and that for DVD-ROM with double layer or DVD+RW is from 18% to 30%. Since the optical disc apparatus 20 (mainly the CPU 40) cannot obtain signals including ADIP information from DVD-ROM, the optical disc apparatus 20 may distinguish DVD-ROM with monolayer from DVD+R and distinguish DVD-ROM with double layers from DVD+RW. After all, the optical disc apparatus may use a most effective technique for selecting a type of optical disc corresponding to the type of the optical disc to be selected.

The CPU 40 judges whether the type of the set optical disc is identified with the type of optical disc (CD-R) used many times in the past in reference to the disc selecting table after judging whether the type of the set optical disc is the type of the optical disc (CD-ROM) used the last time as described above. In case the CPU 40 judges the type of the set optical disc is not one of CD origins when the CPU 40 judges whether the type of the set optical disc is the type of the optical disc (CD-ROM) used the last time, the CPU 40 may exclude optical discs of CD origins from the discs to be selected when the CPU 40 judges whether the type of the set optical disc is identified with the type of optical disc used many times in the past in step 415. The optical disc apparatus may execute the same processes for the type of optical disc of DVD origins.

The entire disclosure of Japanese Patent Application No. 2002-080,086, filed Mar. 22, 2002 is expressly incorporated herein by reference.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

What is claimed is:

1. A program product for use in an optical disc apparatus, wherein the optical disc apparatus includes a control computer, and wherein the apparatus can access plural types of optical discs, and wherein the program product comprises a computer usable medium having computer readable program code means embodied therein for causing the control computer to perform the steps of:

recognizing one type of optical disc based on history information, wherein said one type of optical disc is one of said plural types of optical discs, and wherein said history information is based on usage of optical discs in said apparatus; and judging whether a set optical disc is the recognized one type of optical disc.

2. A program product according to claim 1, wherein the program product causes the control computer to perform the step of judging whether an optical disc used the last time was ejected, and wherein the steps of recognizing the one type of optical disc and judging whether the set optical disc is the recognized type of disc are performed only in case of judging that the disc used the last time was ejected.

3. A program product according to claim 1, wherein the step of recognizing the one type of optical disc includes the step of recognizing the same type of optical disc as a type of optical disc used the last time to be the one type of optical disc.

4. A program product according to claim 1, wherein the step of recognizing the one type of optical disc includes the step of recognizing the same type of optical disc as a type of optical disc previously used the most to be the one type of optical disc.

5. A program product according to claim 1, wherein the program product causes the control computer to perform the steps of:

judging that the set optical disc is not the recognized one type of optical disc;

subsequently, recognizing, based on the history information, a second type of optical disc previously used the most out of the plural types of optical discs, and wherein said second type of disc is not the one type of optical disc; and judging whether the set optical disc is identified with the second type of optical disc.

6. A program product according to claim 1, wherein the program product causes the control computer to perform the step of registering the type of set optical disc in the history information.

7. A computer-readable information recording medium which has recorded therein the program product according to claim 1.

8. A method for selecting a type of optical disc set in an optical disc apparatus, said method comprising:

the first step of recognizing one type of optical disc used the last time based on history information; and the second step of judging whether the type of set optical disc is identified with the recognized one type of optical disc; and the third step of registering the type of set optical disc in the history information.

9. A method according to claim 8 further comprising:

the fourth step of recognizing a second type of optical disc used the most, wherein said second type is not the one type of optical disc; and the fifth step of judging whether the type of set optical disc is identified with the second type of optical disc.

10. A method according to claim 9 further comprising the sixth step of registering the type of set optical disc in the history information.

11. A method according to claim 8 further comprising:

the seventh step of subsequently recognizing, based on the history information, plural types of optical discs used previously, wherein said recognized plural types are not said one type; and the eighth step of judging whether the type of set optical disc is identified with any of the plural types of optical discs recognized in the seventh step.

12. A method according to claim 11 further comprising the ninth step of registering the type of set optical disc in the history information.

13. An optical disc apparatus which accesses plural types of optical discs during an operation of the apparatus, said apparatus comprising:

memory means for storing history information including a type of optical disc used during an immediately preceding operation of the apparatus; and selecting means for selecting a type of optical disc set to the optical disc apparatus based on the history information.

14. An optical disc apparatus according to claim 13, wherein the selecting means includes:

recognizing means for recognizing a type of optical disc based on the history information; and judging means for judging whether the type of set optical disc is identified with the type recognized by the recognizing means.

15. An optical disc apparatus according to claim 13, wherein the memory means is a nonvolatile memory.

16. An optical disc apparatus according to claim 13 further comprising registering means for registering a result of selecting by the selecting means in the history information.

17. An optical disc apparatus, comprising:

a memory for storing history information including a type of optical disc used during an immediately preceding operation of the apparatus; and a selecting device for selecting a type of optical disc set to the optical disc apparatus based on the history information.

* * * * *